Sept. 8, 1970                    E. H. DINGER                    3,527,996
       SWITCHING VOLTAGE REGULATOR USING TIME RATIO CONTROL WITH
                           FORCED COMMUTATION
Filed April 10, 1967                                    4 Sheets-Sheet 1

INVENTOR.
EDWARD H. DINGER
BY
HIS ATTORNEY

Sept. 8, 1970 E. H. DINGER 3,527,996
SWITCHING VOLTAGE REGULATOR USING TIME RATIO CONTROL WITH
FORCED COMMUTATION
Filed April 10, 1967 4 Sheets-Sheet 2
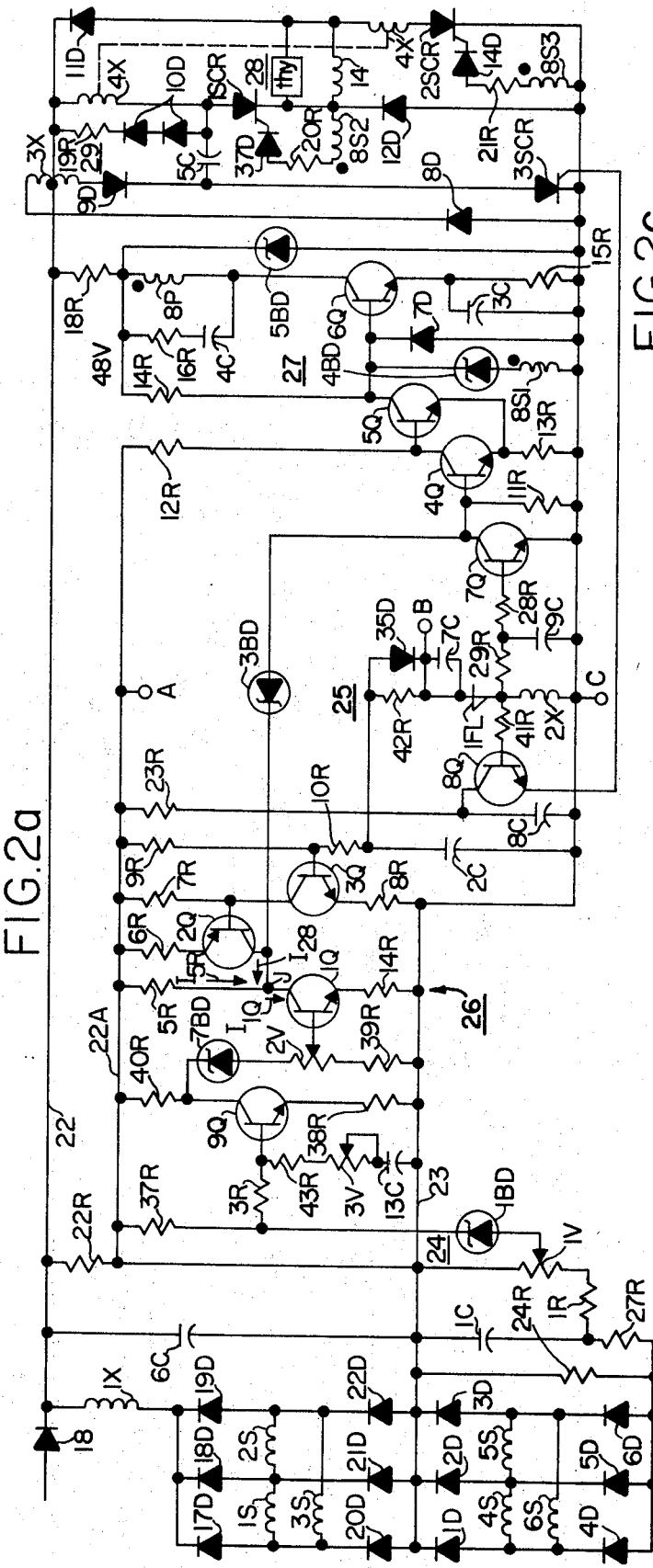
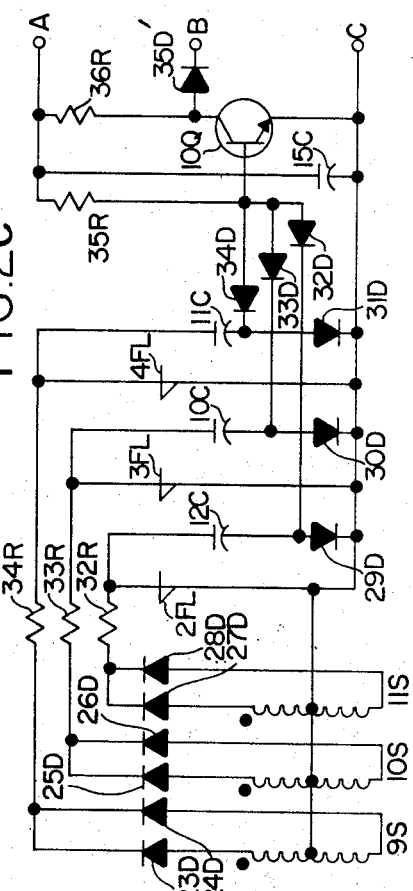
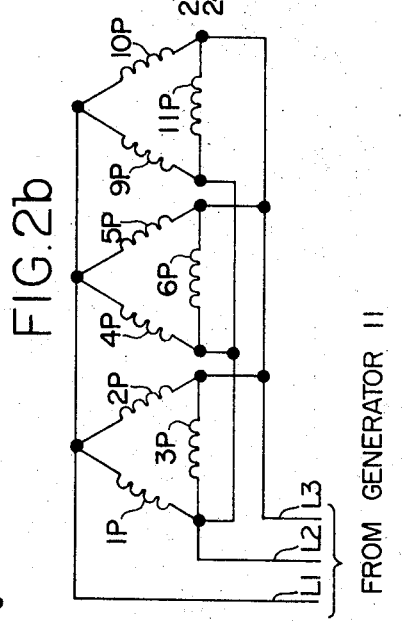
INVENTOR.
EDWARD H. DINGER
BY
HIS ATTORNEY AT POINTS A – 1SCR & 2SCR GATED ON
AT POINTS B – 1SCR & 2SCR GATES OFF
AND 3SCR GATED ON

United States Patent Office 3,527,996
Patented Sept. 8, 1970

3,527,996
SWITCHING VOLTAGE REGULATOR USING TIME RATIO CONTROL WITH FORCED COMMUTATION
Edward H. Dinger, Waynesboro, Va., assignor to General Electric Company, a corporation of New York
Filed Apr. 10, 1967, Ser. No. 629,752
Int. Cl. H02p 9/30
U.S. Cl. 322—28     25 Claims

ABSTRACT OF THE DISCLOSURE

This invention comprises a direct current, static, regulation system primarily intended for use with an electric generator of the rotating type having an exciting field winding. The regulation system includes a DC power supply having a rectifier and filter for deriving direct current excitation voltage from the output of the generator to be regulated, and a blocking diode for operatively coupling a standby battery across the rectifier and filter in case of failure. The regulation system further includes means for deriving an error signal representative of the difference between the actual output of the generator and a reference value, and for combining this error signal with a repetitive, time varying, timing signal to thereby control the output gating pulses produced by a gating pulse generator. The gating pulse generator in turn controls the operation of a direct current chopper, output, power amplifier circuit that controls the excitation of the generator field winding. The direct current chopper, output, power amplifier circuit employs an external impulse commutation circuit, and is arranged in a manner so as to eliminate any possibility of a short circuit due to a commutation failure, and is capable of riding through occasional commutation failures without disastrous results. The DC chopper, output, power amplifier circuit can be operated free-running at a constant frequency or provision may be made for frequency locking on a multiple of the generator output frequency.

---

This invention relates to a new and improved, static regulation system operating from a direct current supply for regulating current flow through a load.

More particularly, the invention relates to a direct current excited, static, generator regulation system for an electric generator of the rotating type for providing regulated current flow through the field winding of the generator in one direction only while allowing for reversible polarity voltages to be developed across the field winding.

In the design of electric current generators of the rotating type, an important design consideration is the manner in which exciting current is supplied to the exciting field winding of the generator. To have fast system response, it is more desirable that the field winding have applied to it, full positive and full negative forcing voltages while allowing only positive current flow therethrough. In the past, the required field winding excitation power has come from a DC or AC exciter mounted on the main shaft of the generator, or may have been supplied by a separately mounted amplidyne or motor-generator set, or it may be fed back from the output terminals of the main generator itself. In all of these arrangements, in some way or another, the field winding exciting excitation power often depends upon the electrical output derived from the generator shaft.

Improved operating characteristics, as well as greater overall reliability, can be achieved by designing the generator field winding and its regulation system, so that it can be operated on direct current power. With such an arrangement, the primary source of exciting power for the generator can be backed up by a standby station battery.

This invention makes available a DC, static, regulation system that is intended primarily for use as a generator field winding regulation system, and which operates on direct current (hereinafter referred to as DC) which normally is obtained from a rectified alternating current (AC) source, but which can be supplied automatically and with negligible time delay from a standby station battery in the event of loss of the normal source of power.

It is therefore an object of the present invention to provide a new and improved DC static regulation system for the field winding of an electric generator of the rotating type with which full positive and full negative regulated direct current forcing voltages may be applied to the field winding while allowing current flow therethrough in only one direction.

Another object of the invention is the provision of a DC static regulation system employing a time ratio control, DC chopper, output amplifier bridge circuit which is so designed as to eliminate any possibility of a short circuit due to a commutation failure (barring defective components).

Still another object of the invention is the provision of a DC chopper output power amplifier bridge circuit employing an external commutation circuit which is capable of riding through occasional commutation faults without disastrous results.

A still further object of the invention is the provision of a DC static generator regulation system employing an output power amplifier that operates at constant frequency with provision for frequency locking on a multiple of the generator output frequency.

In practicing the invention, a direct current excited static generator regulation system for an electric generator of the rotating type is provided. The regulation system includes direct current power supply means for providing direct current excitation of the regulation system. The direct current power supply means includes rectification and filter means which are operatively coupled to the output of the generator being regulated for deriving the direct current excitation voltage therefrom. Blocking diode means are operatively coupled between an auxiliary standby battery and the rectification and filter means for supplying standby DC power automatically and with negligible time delay upon the output from the rectification and filter means falling below a desired value. The regulation system further includes error signal deriving means for comparing a reference signal to a signal representative of the operating characteristics of the generator to be regulated and for deriving an output error signal representative of the difference. Timing signal generating means for deriving a repetitive, time varying, timing signal are also provided together with combining circuit means for combining the output from the error signal deriving means and the timing signal generator means to derive a combined error modulated timing signal. This combined error modulated timing signal is then employed to gate on a gating pulse generator circuit for developing high energy, gating-on signal pulses. The high energy gating-on signal pulses are applied to the control gate of a number of power rated, gate controlled switching elements in an output power amplifier circuit employed to control excitation of the field winding of the generator. The power rated, gate controlled switching elements preferably are gate controlled semiconductor devices of the silicon controlled rectifier type and external impulse commutation circuit means are operatively coupled to each of the silicon controlled rectifiers for commutating off these devices after desired conduction intervals.

In preferred embodiments of the invention, the output power amplifier circuit means comprises a time ratio control, direct current chopping output power amplifier bridge circuit including first and second power rated silicon controlled rectifiers and first and second power rated semiconductor diodes connected in a bridge configuration with the control element of a device to be regulated. The first silicon controlled rectifier, the field winding of the generator to be regulated and the second silicon controlled rectifier are connected in series circuit relationship in the order named across the supply terminals of the direct current power source for applying voltage across the field winding of a first polarity. The first diode, the field winding of the generator and the second diode are connected in series circuit relationship in the order named across the power supply terminal for applying a reverse polarity voltage across the field winding. For this purpose, the first and second diodes are connected in reverse polarity, series circuit relationship with respect to the first and second silicon controlled rectifiers.

The commutation circuit means employed in the time ratio control, direct current chopper, output power amplifier bridge circuit preferably comprises first and second inductively coupled inductors connected to corresponding load terminals of the first and second silicon controlled rectifiers. A commutating capacitor and a series connected commutating silicon controlled rectifier are also provided and are connected in series circuit relationship between one direct current power supply terminal and the juncture of one end of the first inductor with the first silicon controlled rectifier. The remaining end of the first inductor is connected to the remaining direct current power supply terminal and means are provided for charging the commutating capacitor to a predetermined voltage value in the interim between each commutation operation. Commutation of the circuit is initiated by the application of a timing signal pulse to the gate electrode of the commutating silicon controlled rectifier.

In addition to the above, the generator regulation system includes synchronizing circuit means operatively coupled between the output of the generator being regulated and the timing signal generator means for synchronizing the operation of the timing signal generating means with a harmonic of the generator output frequency.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 2 is a detailed schematic circuit diagram of the construction of the direct current, static generator regulation system constructed in accordance with the invention and employed in the system of FIG. 1;

Figure 1:
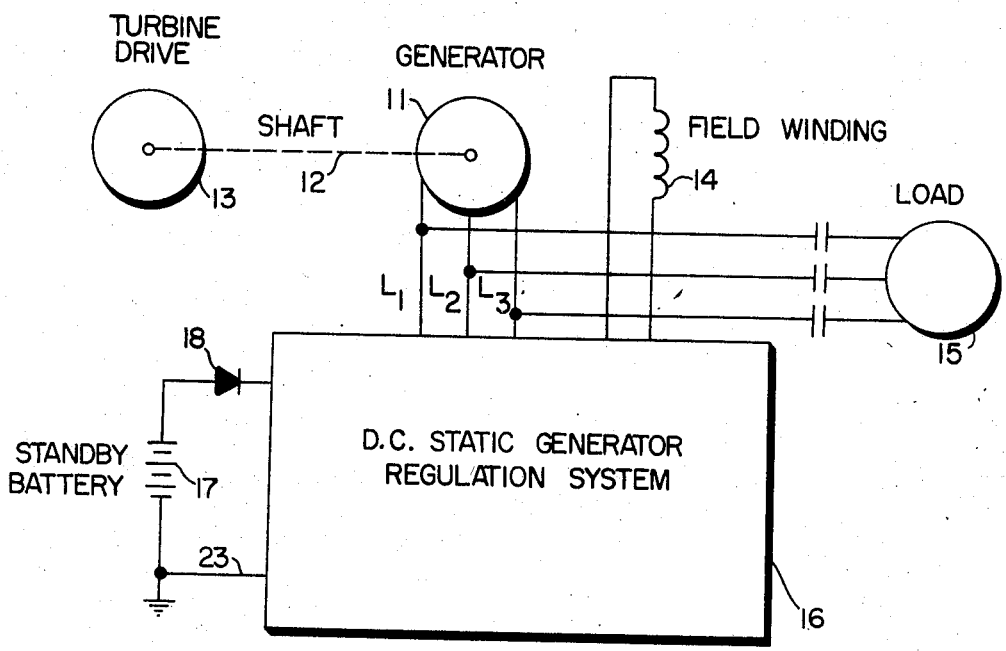
FIG. 1 is a functional block diagram of an overal power system employing a generator of the rotating type whose output power is regulated by a direct current, static generator regulation system constructed in accordance with the invention.

FIG. 1 of the drawings is a functional block diagram of an overall generator drive and regulation system employing a DC, static generator regulation system according to the invention. In FIG. 1, a generator 11 is driven through a shaft 12 by a turbine 13, or other similar drive apparatus and is excited from a field winding 14. The generator 11 may comprise any rotating type electric power generator and may be either an alternating current or direct current machine. In the system shown in FIG. 1, the generator 11 is considered to be a three phase, alternating current generator whose output is supplied to a suitable load device shown at 15, and to one of the inputs of a direct current, static generator regulation system 16 constructed according to the invention. The generator regulation system 16 will be described more fully hereinafter in connection with FIG. 2. In addition to the output from the generator 11 being regulated, the regulation system 16 has a standby battery, shown at 17, coupled thereacross through a unidirectional conducting blocking diode 18 for use as a standby power source. The output from the DC, static generator regulation system 16 is applied across the field winding 14 for regulating the output of generator 11.

FIG. 2 of the drawings is a detailed schematic circuit diagram illustrating the construction of the DC, static generator regulation system 16. In FIG. 2, a direct current power supply means shown generally at 21 on the left-hand side of the figure is provided for supplying direct current excitation for the static generator regulation system. The direct current power supply means 21 is comprised by the secondary windings 1S, 2S and 3S of a transformer whose primary windings 1P, 2P and 3P are connected across the supply lines L1, L2 and L3 from the output of generator 11 as best seen in FIGS. 1 and 2(b). The secondary windings 1S, 2S and 3S operate in conjunction with rectifying diodes 17D through 22D, a filter reactor 1X and a filter capacitor 6C, to supply filtered direct current voltage across a pair of power supply terminals 22 and 23. Terminal 22 is coupled through the unidirectional conducting blocking diode 18 across the standby battery 17 in the manner shown in FIG. 1 of the drawings. By this arrangement, the standby direct current supply voltage from the battery 17 may be introduced into the power bus 22 through diode 18. The rectifier filter arrangement is designed such that for nominal generator output voltage, its direct current output voltage is high enough to back bias the blocking diode 18 so as to prevent power being drawn from the battery during normal operating conditions. Only during startup, or during a fault at the output of the alternator, or in the event of a failure of the rectifier filter arrangement, would power be taken from the standby battery source 17 to supply the regulation system. Power from the terminal 22 is supplied through a dropping resistor 22R to a low voltage DC terminal 22A for supplying excitation voltage for the low voltage signal level components of the generator regulation system.

Feedback of the generator output voltage is provided by feedback transformers whose primary windings 4P, 5P and 6P are supplied through lines L1, L2 and L3, as shown in FIG. 2(b). The secondary windings 4S, 5S and 6S operate through the rectifiers 1D through 6D to provide a direct current feedback voltage which is filtered by a filter circuit comprised by the resistors 24R and 27R and capacitor 1C. The rectified and filtered feedback voltage is supplied through a resistor 1R to a voltage adjusting potentiometer 1V. A Zener diode 1BD is employed as a reference element. The Zener diode 1BD is operated beyond its "knee" region by a current supplied from the terminal 22A through a resistor 37R. The difference or error voltage appears at the junction of resistor 37R with a resistor 3R and is applied to the base of an input transistor 9Q. Input transistor 9Q in conjunction with the components 38R, 39R, 40R, 2V and Zener diode 7BD comprise a single amplification stage whose gain can be varied by means of the variable resistor 2V. The output of this variable gain, single stage amplifier is supplied to the base of an input transistor 1Q. The elements 43R, 3V and 13C are employed to control the stability of the amplification stage comprised in part by transistor 9Q.

A timing signal generating means, shown generally at 25 in the center of FIG. 2(a), is provided for developing a repetitive, sawtooth waveshape, time varying, timing signal. The timing signal generating means 25 is comprised by a relaxation oscillator formed by a unilateral, voltage sensitive, avalanche trigger diode 1FL for developing a sawtooth waveshape timing signal. The sawtooth voltage developed by the relaxation oscillator including avalanche diode 1FL is employed in the regulation system for the purpose (a) of obtaining smooth control of the point of gating on of the power rated, gate controlled, silicon controlled rectifiers employed in the power output stage of the system, and (b), secondly, the timing pulse developed at the end of each sawtooth timing pulse is used to gate on a commutating SCR employed to commutate off the power rated, gate controlled SCR's employed in the power output stage. The components comprising the sawtooth relaxation oscillator 25 include the avalanche trigger diode 1FL, resistors 9R and 10R, capacitor 2C, diode 35D, resistor 42R and inductive reactor 2X.

In operation, upon voltage being applied to the relaxation, sawtooth oscillator 25, the capacitor 2C charges up through resitsors 9R and 10R. Upon the voltage of capacitor 2C becoming equal to the forward drop of diode 35D and the breakover voltage of the unilateral, avalanche trigger diode 1FL, the avalanche trigger diode 1FL is triggered into its fully conducting condition so that the voltage across it collapses to a low value. As a consequence, the capacitor 2C will discharge through diode 35D, avalanche trigger diode 1FL and the reactor 2X in series. The reactor 2X is employed to provide a small reverse voltage across capacitor 2C by resonant action during the discharge for a sufficient period of time to assure recovery of the blocking capability of the avalanche trigger diode 1FL after each sawtooth timing pulse. After avalanche trigger diode 1FL recovers, capacitor 2C will recharge and the process will be repeated. The result will be a continuing, sawtooth waveshape voltage appearing across the capacitor 2C. Although the sawtooth relaxation oscillator 25 is capable of free-running, preferably it is provided with a frequency locking circuit for synchronizing its operation at six times the generator output frequency as will be explained more fully hereinafter in connection with FIG. 2(c). The diode 35D and resistor 42R are not necessary for the proper operation of the sawtooth relaxation oscillator itself but are required in connection with the synchronizing circuit shown in FIG. 2(c) to be described hereinafter. The capacitor 7C is coupled across the unilateral, avalanche trigger diode 1FL to minimize the possibility of premature switching due to transients.

Figure 3A:
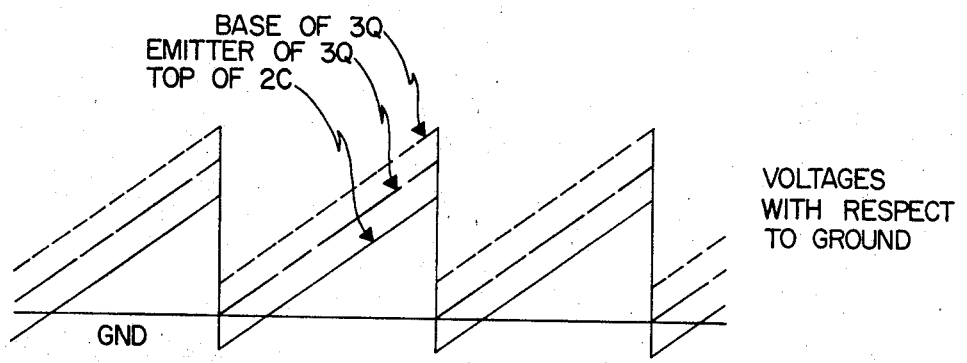
FIG. 3 is a series of voltage versus time characteristic curves illustrating certain signal level operating characteristics of the circuit shown in FIG. 2.
Figure 3B:
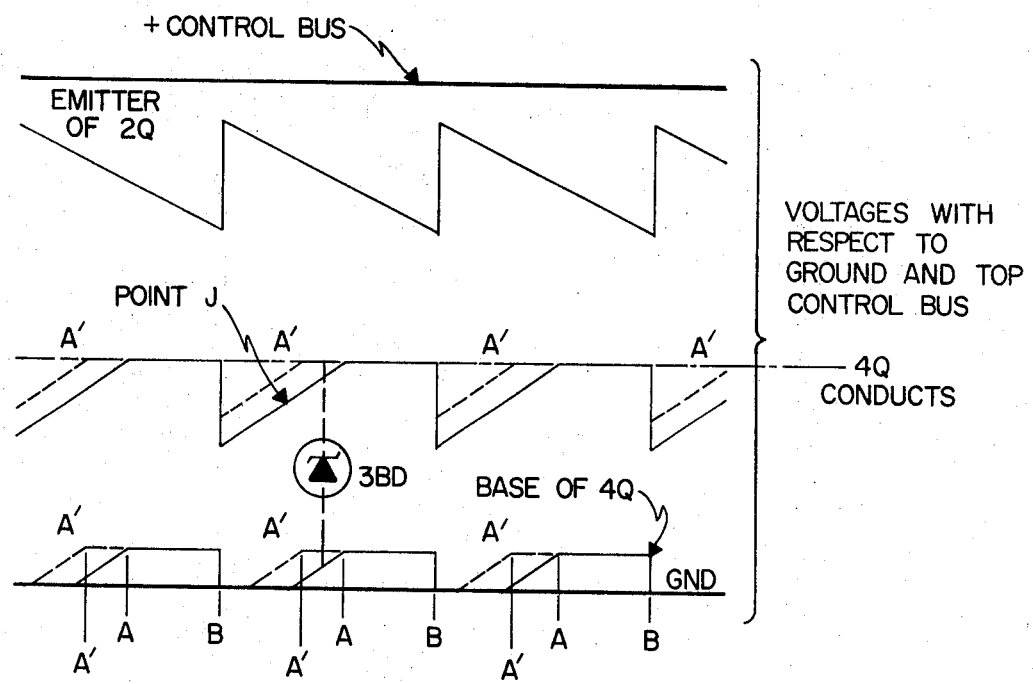

A sawtooth waveform voltage equal to the sawtooth voltage appearing across the capacitor 2C, plus a small bias voltage developed across the resistor 10R, is applied to the base of the transistor 3Q. This results in producing a similar waveshape voltage across the emitter resistor 8R of transistor 3Q. The resulting sawtooth waveshape current that flows in the resistor 8R also flows in the collector resistor 7R minus the small base current flowing into the base of the transistor 3Q. These three voltages are shown by the characteristic curves illustrated in FIG. 3(a) of the drawings. As a consequence of these voltages, an inverted sawtooth waveshape voltage shown in the top curve of FIG. 3(b), appears at the lower end of the resistor 7R (measured with respect to the top power supply terminal 22A) and is applied to the base of the transistor 2Q. This voltage divided by the emitter resistor 6R causes a sawtooth current $I_{2Q}$ to flow out of the collector of transistor 2Q into a junction point J.

The static generator regulation system further includes combining circuit means, shown generally at 26, for combining the output error signal derived by the error signal deriving circuit means 24 with the sawtooth waveshape timing signals developed by timing signal generating means 25. The combining circuit means 26 in effect comprises a summing network for summing the error signal from the error signal deriving means with the sawtooth waveshape timing signal to derive a combined, error modulated, repetitive, sawtooth waveshape, timing signal. This summing network is comprised by the transistor 1Q, transistor 2Q and resistor 5R, all of whose outputs are summed at the junction point J. The voltage applied to the base of transistor 1Q is the DC error signal produced by the error signal deriving circuit means 24, and amplified by the amplification stage including transistor 9Q. A current proportional to this amplified error voltage flows in the emitter resistor 14R and the same current, minus the base current supplied to transistor 1Q, flows from the point J into the collector of transistor 1Q. This current will be identified as $I_{1Q}$. As stated in the preceding paragraph, the sawtooth waveshape current $I_{2Q}$ flows out of the collector of transistor 2Q into the junction point J. From the current directions assigned to the three currents $I_{5R}$, $I_{1Q}$ and $I_{2Q}$, and from Kirchhoff's law, it can be appreciated that:

$$I_{5R} = I_{1Q} - I_{2Q} \quad (1)$$

From Equation 1 the following expression can be derived:

$$V_{5R} = I_{5R}(5R) = (5R)(I_{1Q} - I_{2Q}) \quad (2)$$

From Equation 2, it can be appreciated that the voltage appearing across resistor 5R is the difference between the amplified DC error voltage and the sawtooth waveshape timing voltage. The current and voltage relations appearing at the junction point J are shown in the middle graph of FIG. 3(b) of the drawings. The components for the 3Q transistor stage are selected so that the current drawn by transistor 3Q is small in relation to the charging current for capacitor 2C in order to provide proper operation of the sawtooth generator. Resistor 6R is selected so that the base current drawn by the transistor 2Q is small compared to the current flowing in resistor 7R. Resistor 5R is selected to give the desired amplitude of sawtooth voltage at junction point J.

The error modulated, repetitive, sawtooth waveform timing signal appearing at the summing point J is supplied to and controls the operation of a gating pulse generator circuit means shown generally at 27. The gating pulse generator means 27 is comprised by a transistor 6Q whose collector is connected through the primary winding 8P of a transformer and a dropping resistor 18R, to the direct current power supply terminal 22. The emitter of transistor 6Q is connected through a resistor 15R to the power supply terminal 23. The base of transistor 6Q is connected to the junction of a dropping resistor 14R and Zener diode 4BD connected in series circuit relationship with the secondary winding 8S1 between the low voltage end of dropping resistor 18R and power supply terminal 23. A diode 7D is connected in parallel with the Zener diode 4BD and secondary winding 8S1, and a capacitor 3C is connected across the dropping resistor 15R. A Zener diode 5BD is connected across the series connected, primary winding 8P, transistor 6Q and resistor 15R, for limiting the voltage thereacross, and a series connected resistor 16R and capacitor 4C is connected in parallel with the primary winding 8P. The circuit thus comprised forms a regenerative feedback oscillator circuit which supplies high energy, steep wave front gating-on signal pulses to the control gate of a pair of silicon controlled rectifiers (SCR's) connected in the output power amplifier circuit of the regulation system through transformer winding 8P as will be explained more fully hereinafter.

For a more complete description of the construction and operation of the gating pulse generator means 27, reference is made to my copending application Ser. No. 600,140 entitled "Power Semiconductor Gating Circuit," filed Dec. 8, 1966, and assigned to the assignee of this application. Briefly, however, the operation of the gating pulse generator circuit means 27 is as follows. A small current is supplied through the dropping resistors 18R, 14R, Zener diode 4BD and secondary winding 8S1 to the base of transistor 6Q to cause it to turn on. Upon turn on of transistor 6Q, the primary winding 8P in the collector circuit of transistor 6Q receives some excitation current. As a consequence, additional current is induced in secondary winding 8S1 connected to the base of 6Q which is applied through Zener diode 4BD in the forward direction and causes transistor 6Q to be turned on fully, and to apply full voltage to the primary winding 8P in its collector circuit. Saturation of this transformer initiates a similar regenerative process through windings 8P and 8S1 in the turn-off direction. The turn-off time is controlled by the Zener diode 4BD whose reverse breakdown voltage limits the rate of reset of the core of the transformer. After reset, the small current flowing through resistors 18R, 14R, etc., again turns on the transistor 6Q so that the process is again repeated. As a result, a train of steep wavefront, high energy, gating-on pulses is produced in the primary winding 8P in a free-running manner, the frequency of which is determined by the parameters of the circuit and is adjusted in a manner to be described more fully hereinafter to coincide with the desired operational characteristics of the regulation system.

Control of the free-running, gating pulse signal generator 27 is obtained by means of a switch circuit comprised by transistors 4Q, and 5Q and resistors 12R, 11R and 13R. This switch circuit is in turn controlled by the voltage applied to the base of the transistor 4Q from the junction point J. The voltage applied to the base of transistor 4Q is the voltage at the junction point J minus the voltage across the Zener diode 3BD. Upon the transistor 4Q being turned on, transistor 5Q is turned off, and the free-running oscillator 27 will oscillate and develop pulses for firing the SCR's in the output power amplifier section of the regulation system. Upon the transistor 4Q being turned off, transistor 5Q will be turned on, and will serve to clamp the base of the transistor 6Q to the voltage of the bottom bus 23 thereby preventing further oscillation of the gating pulse generator circuit means 27. As a consequence, gating pulses will be produced by the circuit 27 when the transistor 4Q is turned on and will not be produced upon the transistor 4Q being turned off.

From a consideration of the operation of transistor 4Q in connection with the description of the operation of the free-running, gating pulse generator 27 set forth in the preceding paragraph, it will be appreciated that once the transistor 5Q is switched on, by turning off the transistor 4Q, the gating pulse generator circuit 27 will cease to oscillate immediately. The first output, gating-on pulse obtained when the transistor 5Q is turned off by turning on transistor 4Q, will always be a full width, high energy, steep wave front gating-on pulse, as will all of the succeeding pulses up to the last one. The last pulse may or may not be of full width depending upon the timing of the turn off of transistor 4Q, and hence the turn on of transistor 5Q. The components 16R and 4C prevent voltage overshoot at the collector of the transistor 6Q during the reset interval between pulses generated by the circuit. Also, it should be noted that the frequency of the output gating-on pulses developed by the gating pulse generator circuit means 27 generally is much higher than the operating frequency of the regulation system, or for that matter, it is considerably higher than the frequency of the repetitive, timing signal pulses supplied from timing signal generator 25. For example, which is not to be considered to be limiting, the frequency of the gating-on pulses generated by circuit 27 may be anywhere from 10 to 50 times as high as the frequency of the sawtooth waveshape timing signals generated by the timing signal generator circuit 25 as is best seen from a comparison of FIGS. 4(1) and 4(2) to FIGS. 4(3) and 4(4).

The output power amplifier circuit means for the regulation system is shown at 28 on the right-hand side of FIG. 2(a). The output power amplifier circuit 28 in fact comprises a time ratio control, direct current chopping, power amplifier bridge circuit including first and second, power rated, silicon controlled rectifiers 1SCR and 2SCR, and first and second, power rated semiconductor diodes 11D and 12D connected in a bridge configuration with the field winding 14. The silicon controlled rectifier 1SCR, the field winding 14 and 2SCR are connected in the order named in series circuit relationship through reactor windings 4X and 4X' across the power supply terminals 22 and 23. By this arrangement, upon the SCR's being gated on and rendered conducting, a voltage of a first polarity will be applied across the field winding 14. The first power diode 11D, the field winding 14 and the second power diode 12D also are connected in series circuit relationship in the order named across the power supply terminals 22 and 23 with the diodes 12D and 11D being connected in reverse polarity, series circuit relationship with respect to 1SCR and 2SCR. As a result of this arrangement, a voltage of reverse polarity with respect to that obtained when the SCR's are conducting, is developed and applied across the field winding 14 while current flowing through the field winding is in the same direction as that flowing while the SCR's are conducting. In order to protect the field winding 14, a Thyrite resistor THY is connected in parallel with the field winding.

The silicon controlled rectifier 1SCR is gated on by a gating circuit comprised by a second secondary winding 8S2 connected in series with a resistor 20R and diode 37D between the control gate and the cathode thereof. Similarly, 2SCR is gated on by a gating circuit comprised by a third secondary winding 8S3 connected in series with a resistor 21R and diode 14D between the control gate and cathode thereof. The secondary windings 8S2 and 8S3 in the control gate circuits of each of 1SCR and 2SCR are inductively coupled to the primary winding 8P connected in the collector circuit of transistor 6Q in the gating pulse generator circuit 27. It will be appreciated therefore that each gating pulse produced by the gating pulse generator 27 simultaneously induces a gating-on pulse in the secondary windings 8S2 and 8S3 which is applied to the control gates of each of 1SCR and 2SCR. After each conduction interval, 1SCR and 2SCR are commutated off by a commutating circuit means shown generally at 29 which includes a commutating capacitor 5C and two inductive reactors 4X and 4X' (to be described more fully hereinafter).

The operation of the output power amplifier bridge circuit 28 is as follows: Upon 1SCR and 2SCR being gated on, voltage is supplied to the field winding 14 so that the left-hand end of the winding as viewed by the reader is positive and the right-hand end is negative. After 1SCR and 2SCR have been commutated off by commutation circuit means 29 in a manner to be described more fully hereinafter, the energy stored in the field winding 14 will cause its voltage to reverse, and to supply current into the DC supply bus 22 through the diodes 11D and 12D. This is due to the fact that when the SCR's are commutated off, the inductive energy stored in the field winding 14 causes the polarity of the voltage thereacross to reverse, and to increase in magnitude until it reaches the level of the supply voltage of bus to which it is then clamped through the power diodes 11D and 12D. Thus, it will be appreciated that the field winding voltage is either positive or negative depending upon whether or not the SCR's are conducting, but that in any event current flows through the field winding 14 in only one direction.

The commutation circuit means 29 is comprised by first and second inductively coupled, inductive reactors 4X and 4X' which are connected to corresponding anode load terminals of 1SCR and 2SCR respectively. A commutating capacitor 5C and a series connected commutating silicon controlled rectifier 3SCR are connected in series circuit relationship between the negative power supply terminal 23 and the juncture of one terminal of the first inductive reactor 4X with the anode load terminal of 1SCR. The remaining terminal of the first inductive reactor 4X is connected to the power supply terminal 22. The juncture of the commutating capacitor 5C with the anode load terminal of commutating 3SCR, is connected through a charging circuit means comprised by a diode 9D and a portion of an inductive reactor 3X to the positive power supply terminal 22. The remaining portion of the inductive reactor 3X is connected through the diode 8D to the negative power supply terminal 23. A pair of series connected diodes 10D and resistor 19R are connected in series circuit relationship across the first inductive reactor 4X for clamping the anode of one SCR to the potential of the power supply terminal 22 during a portion of the commutation interval as will be explained more fully hereinafter.

The control gate of commutating 3SCR is connected back to the emitter electrode of a transistor 8Q whose collector is connected to the juncture of a capacitor 8C and resistor 23R connected in series circuit relationship across the power supply terminals 22A and 23. The base of transistor 8Q is connected through a limiting resistor 41R across the reactor 2X in the timing signal generator circuit means 25. The reactor 2X is also coupled through a clamping circuit comprised by a pair of series connected resistors 28R, 29R and a capacitor 9C to the base of a clamping transistor 7Q. The clamping transistor 7Q has its collector connected to the base of the input transistor 4Q of the gating pulse generator circuit 27 and its emitter is connected to the power supply terminal 23.

In operation, the voltage spikes appearing across the reactor 2X due to the discharge of capacitor 2C at the trailing end of each sawtooth timing signal pulse developed by the sawtooth waveshape timing signal generator 25 are applied through the limiting resistor 41 to the base of transistor 8Q. The collector of transistor 8Q is supplied from the capacitor 8C which is connected through resistor 23R to the positive supply terminal 22A. The result of the use of the resistor 23R and capacitor 8C is to pro- provide a narrow, high current firing pulse from capacitor 8C through transistor 8Q to the control gate of commutating 3SCR without requiring that the pulse be drawn directly off the supply terminals. Thus, it will be appreciated that as soon as the trailing edge pulse appears across the reactor 2X at the trailing edge of each sawtooth waveshape timing pulse, a firing pulse is supplied to commutating 3SCR.

It is imperative that the gating-on pulses supplied to the control gates of 1SCR and 2SCR by the gating pulse generator circuit 27 be removed without requiring that the capacitor 2C become fully discharged, at the same instant that a firing pulse is supplied to commutating 3SCR. This almost instantaneous removal of the gating pulses from the control gates of 1SCR and 2SCR is provided by the clamping circuit comprised by resistors 28R, 29R, capacitor 9C and transistor 7Q. Immediately after the pulse appears across the reactor 2X, the transistor 7Q will saturate thereby shorting out the turn-on signal being supplied to the base of the turn-on transistor 4Q from the main signal channel through Zener diode 3BD. Thus, it will be seen that the gating pulse generator circuit 27 is inhibited from further operation simultaneously with the development of the turn-on signal pulse supplied to the commutating 3SCR. The capacitor 9C performs a pulse stretching function which assures that the capacitor 2C in the timing signal generator is allowed to become fully discharged before the clamping transistor 7Q is turned off.

Figure 4:
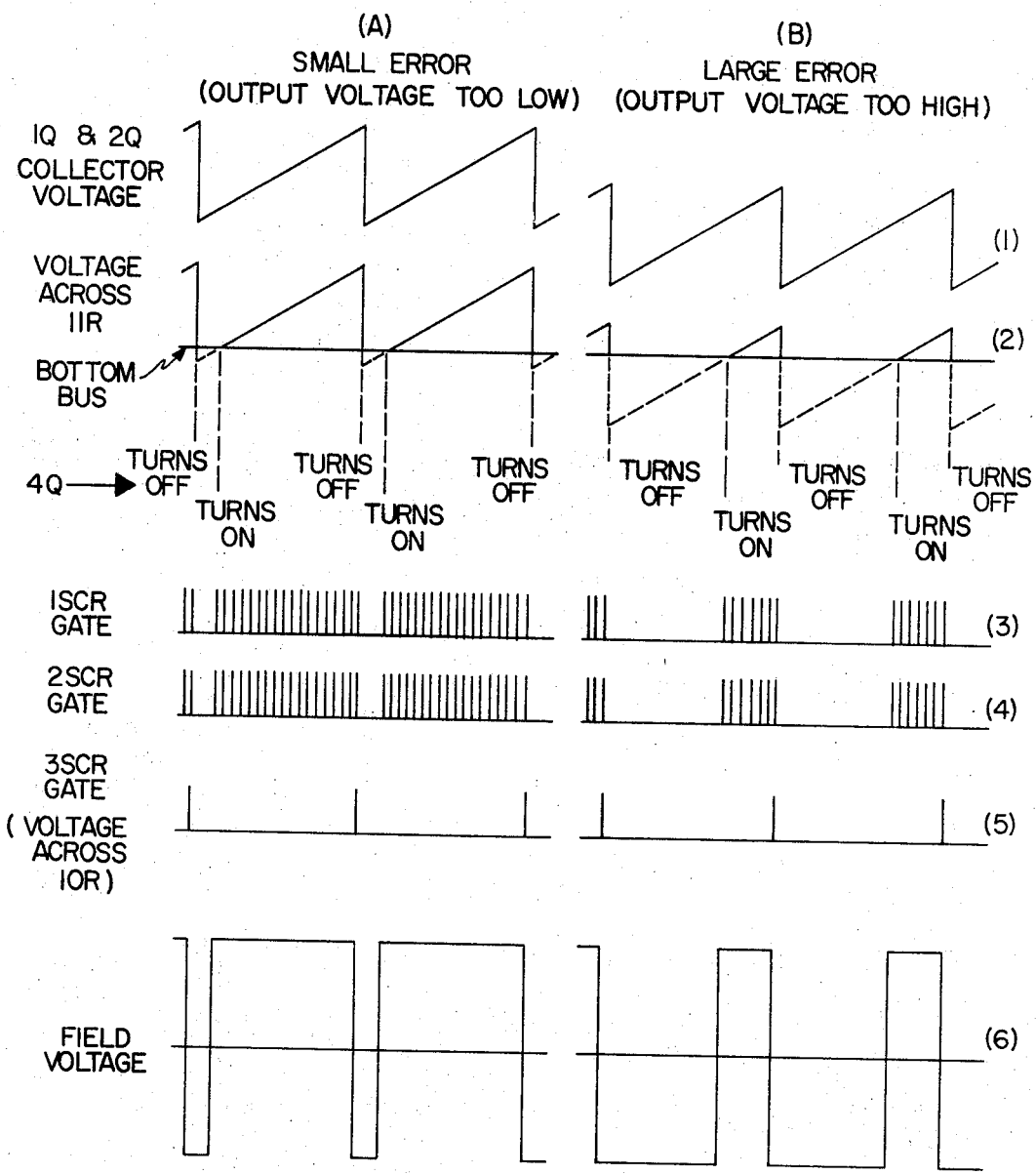
FIG. 4 is a second series of voltage versus time characteristic curves showing the relationship of the gating signals to the output power pulses obtained with the circuit of FIG. 2.

The commutating pulses for turning off 1SCR and 2SCR are obtained by turning on commutating 3SCR with a narrow gate pulse produced at the trailing edge of each sawtooth waveshape timing pulse. This relationship is best illustrated in FIG. 4(5) of the drawings. Prior to the turn on of commutating 3SCR, commutating capacitor 5C will have been charged up (due to a previous charging action to be described later) such that the left-hand end of 5C will be positive with respect to the common, bottom supply terminal 23, by about twice the main DC supply voltage or 2E. The right-hand end of 5C will be at the same potential as the positive terminal of the DC supply terminal 22. Upon commutating 3SCR being fired, the left-hand side of commutating capacitor 5C will be brought to the potential of the common supply terminal 23. The corresponding change in the voltage on the right-hand side of commutating capacitor 5C will cause that side, and hence the anode of 1SCR to which it is connected, to be driven below the voltage of the common, bottom supply terminal 23. At this instant, approximately 2E voltage will be applied to the top reactor winding 4X. By transformer action between the two bifilar windings 4X and 4X', a voltage of 2E will also appear across the bottom winding of 4X'. Simultaneously, the current formerly flowing through 1SCR from left to right, through field winding 14 and through 2SCR will now flow from the common bus 23, up through diode 12D, through the field winding 14 in the same direction as before, and then through diode 11D into the positive bus. It should be noted at this point that the interruption of current flow in 1SCR and 2SCR will be resisted by the energy stored in the inductance of the field winding 14 with the result that the field winding 14 will generate the reverse voltage necessary to find the path available through diodes 12D and 11D so as to permit current flow in the direction required by the energy stored in the field inductance. As a consequence, both 1SCR and 2SCR will be back biased by a voltage equal to E, and hence will turn off. Concurrently commutating capacitor 5C will begin discharging at a rate related to the characteristic of the resonant circuit consisting of the inductive reactor 4X and commutating capacitor 5C and to the current flowing in 4X at the moment of commutation.

Upon the anode of 1SCR being carried to the positive bus by the oscillation of commutating capacitor 5C and reactor 4X, it is prevented from going much more positive by the diodes 10D which clamp the anode of 1SCR to the top direct current supply terminal 22 through resistor 19R. Energy trapped in reactor 4X is dissipated in 19R. Although the anode of 1SCR is prevented from going excessively positive, it does go sufficiently positive such that when it returns to the positive bus a short time later, it provides turn-off bias, through commutating capacitor 5C, to the anode of commutating 3SCR. Initial charging of the commutating capacitor 5C, as assumed in the discussion above, is accomplished as follows. From the instant that commutating 3SCR turns on, voltage will appear across the bottom half of the reactor 3X. However, since the inductance of reactor 3X is large, it appears almost as an open circuit during the commutation interval. As a consequence, its presence in the circuit has relatively little effect on the commutation operation itself. The function of 3X is to recharge the commutation capacitor efficiently in the intervals between commutation pulses. Reactor 3X and commutating capacitor 5C form a resonant recharge circuit that results in the voltage at the left hand of commutating capacitor 5C going to approximately 2E, a condition which was assumed initially. The resonant frequency of this circuit obviously should be high enough to complete the recharge process in the intervals of time between the commutating pulses. During this recharge, the extended winding on the reactor 3X acts in conjunction with the diode 8D to limit the recharge voltage on commutating capacitor 5C to the value 2E for all field winding currents. Otherwise, the commutation capacitor 5C might charge to the value 2E only under no load conditions and would go to higher voltages for higher field currents flowing in the field winding 14.

FIG. 4 of the drawings illustrates a series of voltage versus time characteristic waveshapes which depict the operating characteristics of the new and improved, static direct current generator regulation system at various points in the system. The waveshapes shown in the vertical column A are for a small error voltage where the output voltage of the generator is assumed to be too low, and the waveshapes shown in vertical column B are for a large error signal where the output voltage of the generator being regulated is assumed to be too high. Considering these two columns of characteristic curves, it will be appreciated from the waveshapes shown in FIGS. 4(1) and 4(2), that the error signal tends to modulate the point at which the sawtooth waveshape timing signal causes the turn-on transistor 4Q to be turned on and turned off. Thus, for a small error signal input, transistor 4Q is turned on earlier and remains on for a longer interval of time. For a larger error signal, corresponding to an output generator voltage which is too high, input transistor 4Q is turned on later, and remains on for only a short interval of time. The effect on the output from gating pulse generator 27 is shown in FIGS. 4(3) and 4(4) wherein it will be seen that for the small error signal, a large number of gating-on pulses are applied to the control gates of 1SCR and 2SCR, and for the larger error signal, fewer gating-on pulses are supplied for only short intervals of time. In all instances, commutating pulses are produced at fixed intervals of time and occur at the trailing edge of the fixed frequency, sawtooth waveshape timing signals as shown in FIG. 4(5). The curves shown in FIG. 4(6) illustrate the resulting, varying width, time ratio controlled, voltage pulse appearing across the field winding 14 for regulating the value of the output voltage of the generator. Thus the alternating voltage pulses, FIG. 4(6), have a frequency which is an integral multiple of the frequency of said generator and the ratio of positive to negative polarity portions of each cycle are made proportional to the departure of the generator output voltage from a given value.

In the preceding discussion, free-running operation of the sawtooth waveshape timing signal generator 25 has been assumed. While the overall regulation system can be operated with the sawtooth generator 25 running free, it has been determined that there is a small modulation of the output voltage waveshape produced by a generator being regulated with the system operated in a free-running manner. Although small in amplitude, this modulation appears on a scope display as a small, higher frequency wave crawling over the surface of the larger output voltage waveshape. It also will appear as a slight periodic variation in the output voltage as read on a voltmeter. This modulation and its effects are due to the lack of a fixed time relationship between the field current ripple (which is related to the chopping frequency developed by the pulse generator circuit means 27) and the basic system output frequency (which is related to the generator speed). For these reasons, a circuit for locking the sawtooth frequency of the timing signal generator 25 to a multiple of the output frequency has been devised for use in those more demanding applications in which the modulation described above may be objectionable. A frequency of six times the output frequency of 60 cycles was selected because this 360 cycle frequency, while being a convenient one to obtain, is also high enough not to limit the response of the overall regulation system.

The frequency locking circuit is shown in FIG. 2(c) and includes terminals marked A, B and C which indicate the electrical connection points between the frequency locking circuit and the basic regulation system shown in FIG. 2(a). The principle of operation of the frequency locking circuit is that of introducing voltage pulses into the sawtooth timing generator 25 for the purpose of triggering the end of each sawtooth ahead of the time that the end of the sawtooth otherwise normally would occur on a free-running basis. In order for such triggering to take place, the free-running frequency must be set lower than the lowest rate at which the synchronizing pulses will ordinarily occur. Synchronizing is automatic in the sense that, during startup, while the voltage is building up, the sawtooth waveshape, timing signal generator 25 will first run free, and thereafter automatically will be synchronized to six times the output frequency after the output voltage is built up sufficiently for the synchronizing circuit to take over.

For synchronizing purposes, the voltage between lines L₁ and L₂, for example, is sensed by the transformer winding 9P (shown in FIG. 2(b)) whose center tapped secondary 9S supplies voltage on alternate half cycles through diodes 23D and 24D into a network consisting of resistor 34R, unilateral conducting, avalanche triggered diode 4FL, capacitor 11C and diode 31D. Similar sensing networks are provided in connection with the sensing windings 10P and 11P. With this synchronizing circuit arrangement, two synchronizing pulses are derived from each of the three phases, making a total of six pulses per cycle available to trigger the sawtooth waveshape timing signal generator 25 at six times the generator output frequency. These synchronizing pulses are developed at the zero crossing points for each of the three phase voltages.

In operation, at the point in the cycle when the dot end of the secondary winding 9S, for example, starts to go positive, diode 23D conducts and current flows through resistor 34R, capacitor 11C and diode 31D. The time constant of resistor 34R and capacitor 11C is small enough so that the voltage across capacitor 11C follows closely the incoming voltage of winding 9S. This voltage is also supplied across the avalanche trigger diode 4FL. Upon the breakdown voltage of the avalanche trigger diode 4FL being reached, the positive terminal of capacitor 11C will be taken to the voltage of the bottom supply terminal 23, and the bottom end of capacitor 11C will thus be taken below the voltage of the bottom supply terminal 23 instantaneously by an amount of voltage equal to that which had been attained across capacitor 11C just before breakdown of avalanche diode 4FL.

As a consequence of the above, base drive current that had been flowing into the base of a transistor 10Q through resistor 35R will be diverted through the diode 34D into the bottom end of capacitor 11C. As a result, the transistor 10Q will turn off and current will flow from the top power supply terminal 22A down through resistor 36R, through diode 35D′, to the connection point B, through resistor 42R and into capacitor 2C in the timing signal generator 25 of FIG. 2(a). A small voltage will thus appear across resistor 42R, positive at the bottom end with respect to the top end, that will add to the voltage across avalanche trigger diode 1FL thereby causing it to break down and to discharge capacitor 2C at this point in time. The width of the turn-off pulse at the base of transistor 10Q is made very small and is governed by the values of the capacitor 11C, resistor 34R and the voltage of supply terminal 22A. During the remainder of the half cycle being considered, the voltage of the secondary winding 9S appears across resistor 34R and the low forward drop of avalanche trigger diode 4FL. At the end of the half cycle, the avalanche diode 4FL recovers its blocking capability.

At the beginning of the next half cycle, another turn-off pulse is supplied to the base of transistor 10Q in a similar manner to that described above except that the current is supplied through the diode 24D instead of diode 23D. Similarly, two turn-off pulses per cycle are supplied to transistor 10Q from the secondary windings 10S through diode 33D, and two more pulses per cycle are supplied to transistor 10Q from the secondary winding 11S through diode 32D. Thus, a total of six turn-off pulses per cycle are supplied to the base of transistor 10Q with the result that six synchronizing pulses per cycle of output frequency are supplied from the collector of transistor 10Q to the capacitor 2C of the sawtooth waveshape timing signal generator 25. In this manner, the gating-on of the SCR's in the output power amplifier bridge circuit 28 is locked in with a harmonic of the generator output frequency.

While the new and improved direct current, static regulation system according to the invention has been described in connection with the particular problem of supplying excitation to an alternator field winding through a DC chopping SCR power amplifier bridge, it has broader applications. The system is particularly useful for supplying inductive loads, such as AC and DC machine fields, in regulating applications in which both forward and reverse voltage, but only forward current, is required. It also can be used with such loads in non-regulating applications and to a lesser extent, to resistive loads. Because of the arrangement of the output power amplifier bridge, it is not possible, barring defective components, to short out the DC supply by improper gating or by failure to commutate the SCR's. Current is limited to only that required by the load. The circuit employs reliable external commutation, which in contrast to other known commutation techniques, continues to provide turn-off pulses even though commutation should fail to take place on certain occasions. That is, the external pulse commutation circuit employed in the invention, in addition to the configuration of the power amplifier bridge, permits the circuit to ride through an occasional commutation failure without disastrous results. In operation, the regulation system provides a linear relationship between the error signal and the output load voltage being regulated. Further, the regulation system including the commutation circuit permits the full-on and full-off conditions without the use of range limits and their attendant adjustment requirements and other troublesome features.

Having described certain embodiments of a new and improved direct current, static regulation system constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed and desired to be secured by Letters Patent of the United States is:

1. A direct current static regulation system including in combination; direct current power supply means for providing direct current excitation of the regulation system; error signal deriving means for comparing a reference signal to a signal representative of the operating characteristics of a device to be regulated and deriving an output error signal representative of the difference; timing signal generating means for developing a repetitive, time varying timing signal; combining circuit means operatively coupled to the output from the error signal deriving means and the timing signal generating means and deriving a combined, output error modulated, repetitive timing signal of given frequency; gating pulse generator circuit means for developing high energy gating signal pulses, said gating pulse generator circuit means having an input control element operatively coupled to and controlled by the output error modulated timing signal from the combining circuit means; means for exciting said device whose operation is to be regulated with positive and negative polarity field winding voltage excitation signals having said predetermined frequency comprising output power amplifier circuit means including power rated gate controlled switching elements supplied by the direct current power supply means, and means responsive to the output from the gating pulse generator circuit means for controlling the conduction of said power rated, gate controlled switching elements.

2. A direct current static regulation system according to claim 1 wherein the power rated, gate controlled switching elements are gate controlled semiconductor devices of the silicon controlled rectifier type and wherein the system further includes; external impulse commutation circuit means operatively coupled to each of the gate controlled semiconductor devices and controlled by the timing signal generating means for commutating off the gate controlled semiconductor devices after desired conduction intervals to thereby control operation of the device to be regulated.

3. A direct current static regulation system according to claim 2 wherein the output power amplifier circuit means comprises a time ratio control, direct current chopping circuit including first and second, power rated, silicon controlled rectifiers and first and second, power rated, semiconductor diodes connected in a bridge configuration with the device to be regulated, the first silicon controlled rectifier, the device to be regulated and the second silicon controlled rectifier being connected in series circuit relationship in the order named across the supply terminals of the direct current power supply means for applying a voltage across the control element of a first polarity, and the first diode, the device to be regulated and the second diode being connected in series circuit relationship in the order named across the supply terminals of the direct current power supply means, the first and second diodes being connected in reverse polarity series circuit relationship with respect to the first and second silicon controlled rectifiers respectively, whereby a voltage of reversible polarity can be developed across said device while conducting current therethrough in only one direction.

4. A direct current static regulation system according to claim 3 wherein the commutation circuit means comprises first and second inductively coupled inductors connected to corresponding load terminals of the first and second silicon controlled rectifiers, a commutating capacitor and a series connected commutating silicon controlled rectifier having its gate electrode coupled to the output from the timing signal generator, the commutating capacitor and commutating silicon controlled rectifier being connected in series circuit relationship between one direct current power supply terminal and the juncture of one end of the first inductor with the first silicon controlled rectifier, the remaining end of the first inductor being connected to the remaining direct current power supply terminal, and means for charging the commutating capacitor to a predetermined voltage value intermediate each commutation operation.

5. A direct current, static regulation system according to claim 2 wherein the timing signal generating means comprises a sawtooth generator comprised by a voltage sensitive, avalanche trigger diode, a resistor and capacitor charging network connected across the direct current power supply terminals, said avalanche trigger diode being connected across the capacitor, and transistor output means coupled to the capacitor for deriving therefrom a repetitive, time varying, sawtooth waveform, output timing signal.

6. A direct current, static regulation system according to claim 5 wherein the gating pulse generator means comprises transistor means having emitter, collector and base electrode means, a transformer having inductively coupled primary and feedback secondary windings, first impedance means operatively connected in series circuit relationship with the primary winding and the emitter-collector of the transistor means across a source of energizing potential, and turn-on circuit means including said secondary winding operatively coupled to the base of said transistor means in feedback relation for applying turn-on potentials to the base of said transistor means to cause it to turn on, said primary and secondary windings and said first impedance means coacting to cause said transistor means to turn off after an interval of conduction in a relaxation oscillatory manner.

7. A direct current, static regulation system according to claim 6 wherein the transformer has at least one second secondary winding inductively coupled to the primary winding thereof for deriving output gating pulses for application to the gating electrodes of the power rated, gate controlled switching elements in the output power circuit means.

8. A direct current static regulation system according to claim 7 wherein said turn-on circuit means includes shunt transistor means operatively coupled to the base of the first mentioned transistor means for controlling turn-on and turn-off of the first mentioned transistor means in conjunction with the primary and feedback secondary windings of the transformer and said first impedance means, the conductivity of the shunt transistor means being controlled by the combined, error modulated, repetitive, timing signal appearing at the output from the combining circuit means.

9. A direct current static regulation system according to claim 8 wherein the output power amplifier circuit means comprises a time ratio control direct current chopping, output power amplifier bridge circuit including first and second power rated, silicon controlled rectifiers and first and second, power rated, semiconductor diodes connected in a bridge configuration with the device to be regulated, the first silicon controlled rectifier, the device to be regulated and the second silicon controlled rectifier being connected in series circuit relationship in the order named across the supply terminals of the direct current power supply means for applying a voltage across said device of a first polarity, and the first diode, the device to be regulated and the second diode being connected in series circuit relationship in the order named across the supply terminals of the direct current power supply means, the first and second diodes being connected in reverse polarity series circuit relationship with respect to the first and second silicon controlled rectifiers respectively, whereby a voltage of reversible polarity can be developed across said device while conducting current therethrough in only one direction.

10. A direct current, static regulation system according to claim 9 wherein the commutation circuit means comprises first and second inductively coupled inductors connected to corresponding load terminals of the first and second silicon controlled rectifiers, a commutating capacitor and a commutating silicon controlled rectifier having its gate electrode coupled to the output from the timing signal generator, the commutating capacitor and commutating silicon controlled rectifier being connected in series circuit relationship between one direct current power supply terminal and the juncture of one end of the first inductor with the first silicon controlled rectifier, the remaining end of the first inductor being connected to the remaining, direct current power supply terminal, and means for charging the commutating capacitor to a predetermined voltage value intermediate each commutation operation.

11. A time ratio control, direct current chopper, output power amplifier bridge circuit including in combination first and second power rated, silicon controlled rectifiers and first and second power rated, semiconductor diodes connected in a bridge configuration with a load, the first silicon controlled rectifier, the load and the second silicon controlled rectifier being connected in series circuit relationship in the order named across the supply terminals of a direct current power source for applying a voltage across the load of a first polarity, and the first diode, the load and the second diode being connected in series circuit relationship in the order named across the supply terminals of the direct current power source, the first and second diodes being connected in reverse polarity series circuit relationship with respect to the first and second silicon controlled rectifiers respectively, whereby a voltage of reversible polarity can be developed across the load while conducting current therethrough in the same direction, and commutation circuit means operatively coupled to each of the power rated silicon controlled rectifiers for commutating off the silicon controlled rectifiers after desired conduction intervals.

12. A time ratio control, direct current, chopper output power amplifier bridge circuit according to claim 11 wherein the commutation circuit means comprises first and second inductively coupled inductors connected to corresponding load terminals of the first and second silicon controlled rectifiers, a commutating capacitor and a commutating silicon controlled rectifier having its gate electrode coupled to the output from an external commutating signal source, the commutating capacitor and commutating silicon controlled rectifier being connected in series circuit relationship between one direct current power supply terminal and the juncture of one end of the first inductor with the first silicon controlled rectifier, the remaining end of the first inductor being connected to the remaining direct current power supply terminal, and means for charging the commutating capacitor to a predetermined voltage value intermediate each commutation operation.

13. A direct current excited, static, generator regulation system for an electric generator of the rotating type having an exciting field winding for controlling the output voltage of the generator, the system including direct current power supply means for providing direct current excitation of the regulation system, the direct current power supply means including rectification and filter means operatively coupled to the output of the generator being regulated for deriving the direct current excitation voltage therefrom, and blocking unidirectional conducting means for operatively coupling an auxiliary standby battery source of direct current across the rectification and filter means during intervals where the output from the rectification and filter means is below a desired value; error signal deriving means for comparing a reference signal to a signal representative of the operating characteristics of the generator to be regulated and deriving an output error signal representative of the difference; timing signal generating means for deriving a repetitive, time varying, timing signal; combining circuit means operatively coupled to the output from the error signal deriving means and the timing signal generating means for deriving a combined, output error modulated timing signal; gating pulse generator circuit means for developing high energy, gating-on signal pulses, said gating pulse generator circuit means having an input control element operatively coupled to and controlled by the output error modulated timing signal from the combining circuit means; and output power amplifier circuit means comprised by power rated, gate controlled switching elements supplied by the direct current power supply means and controlling excitation of the field winding of the generator whose operation is to be regulated, the control gates of the power rated, gate controlled switching elements being operatively coupled to and controlled by the output from the gating pulse generator circuit means.

14. A direct current excited, static, generator regulation system according to claim 13 wherein the power rated, gate controlled switching elements are gate controlled semiconductor devices of the silicon controlled rectifier type and wherein the system further includes; external impulse commutation circuit means operatively coupled to each of the gate controlled semiconductor devices and controlled by the timing signal generating means for commutating off the gate controlled semiconductor devices after desired conduction intervals to thereby control operation of the generator whose output is to be regulated.

15. A direct current excited, static generator regulation system according to claim 14 wherein the timing signal generating means comprises a sawtooth generator comprised by a voltage sensitive, avalanche trigger diode, a resistor and capacitor charging network connected across the direct current power supply terminals, said avalanche trigger diode being connected across the capacitor, and transistor output means connected across the capacitor for deriving therefrom a repetitive, time varying, sawtooth waveform, timing signal.

16. A direct current excited, static, generator regulation system according to claim 15 wherein the gating pulse generator means comprises transistor means having emitter, collector and base electrode means, a transformer having inductively coupled primary and feedback secondary windings, first impedance means operatively connected in series circuit relationship with the primary winding and the emitter-collector of the transistor means across a source of energizing potential, and turn-on circuit means including said secondary winding operatively coupled to the base of said transistor means in feedback relation for applying turn-on potentials to the base of said transistor means to cause it to turn on, said primary and secondary windings and said first impedance means coacting to cause said transistor means to turn off after an interval of conduction in a relaxation oscillatory manner.

17. A direct current excited, static, generator regulation system according to claim 16 wherein the transformer has at least one second secondary winding inductively coupled to the primary winding thereof for deriving output gating pulses for application to the gating electrodes of the power rated, gate controlled switching elements in the output power circuit means.

18. A direct current excited, static, generator regulation system according to claim 17 wherein said turn-on circuit means includes shunt transistor means operatively coupled to the base of the first mentioned transistor means for controlling turn-on and turn-off of the first mentioned transistor means in conjunction with the primary and feedback secondary windings of the transformer and said first impedance means, the conductivity of the shunt transistor means being controlled by the combined, error modulated, repetitive, timing signal appearing at the output from the combining circuit means.

19. A direct current excited, static, generator regulation system according to claim 18 wherein the output power amplifier circuit means comprises a time ratio control, direct current chopping output power amplifier bridge circuit including first and second power rated, silicon controlled rectifiers and first and second power rated, semiconductor diodes connected in a bridge configuration with the field winding of the generator to be regulated, the first silicon controlled rectifier, the field winding and the second silicon controlled rectifier being connected in series circuit relationship in the order named across the supply terminals of the direct current power supply means for applying a voltage across the field winding of a first polarity, and the first diode, the field winding and the second diode being connected in series circuit relationship in the order named across the supply terminals of the direct current power supply means, the first and second diodes being connected in reverse polarity series circuit relationship with respect to the first and second silicon controlled rectifiers respectively, whereby a voltage of reversible polarity can be developed across the field winding while conducting current therethrough in only one direction.

20. A direct current excited, static, generator regulation system according to claim 19 wherein the commutation circuit means comprises first and second inductively coupled inductors connected to corresponding load terminals of the first and second silicon controlled rectifiers, a commutating capacitor and a commutating silicon controlled rectifier having its gate electrode coupled to the output from the timing signal generator, the commutating capacitor and commutating silicon controlled rectifier being connected in series circuit relationship between one direct current power supply terminal and the juncture of one end of the first inductor with the first silicon controlled rectifier, the remaining end of the first inductor being connected to the remaining direct current power supply terminal, and means for charging the commutating capacitor to a predetermined voltage value intermediate each commutation operation.

21. A direct current excited, static, generator regulation system according to claim 20 wherein synchronizing circuit means are provided for synchronizing the operation of the gating pulse generator means with the output frequency of the generator being regulated, said synchronizing circuit means comprising means operatively coupled to the output of the generator being regulated for deriving a set of synchronizing pulses therefrom whose repetition rate is at a harmonic of the generator frequency, and additional charging circuit means operatively coupled across the capacitor in said timing signal generator and controlled by the output from said synchronizing pulse deriving means for additionally controlling the charge across said capacitor to thereby control the operation of said timing signal generator.

22. A regulating system for an electric generator of the type comprising a DC exciting field winding comprising a source of positive and negative polarity field winding voltage excitation signals having a predetermined recurrence frequency, means responsive to departure of the output voltage of said generator from a given value for proportionally changing the ratio of positive to negative polarity portions of each cycle of said field winding voltage excitation signals for controlling the voltage excitation of said field winding while allowing only positive field excitation current.

23. An arrangement according to claim 22 wherein said generator output voltage is an AC voltage having said given frequency.

24. An arrangement according to claim 23 wherein said means for changing the ratio of positive to negative polarity portions of each cycle of said field winding excitation signals comprises silicon controlled rectifiers, means for energizing the anode cathode paths of said silicon controlled rectifiers with direct voltage, a source of external commutation signals having said given frequency, means responsive to said commutation signals for controlling the turnoff of said silicon controlled rectifiers at said given frequency, and means responsive to the departure of the output voltage of said generator from said given value for controlling the turnon of said silicon controlled rectifiers.

25. An arrangement according to claim 24 wherein said means for energizing with direct voltage normally comprises an operating source of DC, a standby source of DC, and means responsive to the generator voltage falling below a given value for energizing the anode-cathode paths of said silicon controlled rectifiers with voltage from said standby source instead of said operating source of direct voltage.

References Cited
UNITED STATES PATENTS 3,214,599    10/1965    Wellford _____ 322—28 X
3,447,065    5/1969    Kuhn _____ 322—28 X ORIS L. RADER, Primary Examiner H. HUBERFELD, Assistant Examiner U.S. Cl. X.R.

322—73

UNITED STATES PATENT OFFICE
CERTIFICATE OF CORRECTION

Patent No. 3,527,996　　　　　　　　　　　　　　September 8, 1970

Edward H. Dinger

It is certified that error appears in the above identified patent and that said Letters Patent are hereby corrected as shown below:

Column 1, line 62, "fack" should read -- back --; line 64, cancel "exciting". Column 2, line 18, after "output" insert -- power --. Column 3, line 48, "overal" should read -- overall --. Column 5, line 17, "resitsors" should read -- resistors --. Column 8, line 54, after "bus" insert -- 22 --. Column 9, line 30, cancel "pro-". Column 13, line 15, before "full-on" insert -- output power amplifier bridge to be controlled between --.

Signed and sealed this 30th day of March 1971.

(SEAL)
Attest:

EDWARD M. FLETCHER, JR.　　　　　　　　　　WILLIAM E. SCHUYLER, JR.
Attesting Officer　　　　　　　　　　　　　Commissioner of Patents